United States Patent
Oliver (10) Patent No.: US 10,194,078 B2
(45) Date of Patent: Jan. 29, 2019

(54) HAPTIC ENABLED DEVICE WITH MULTI-IMAGE CAPTURING ABILITIES

(71) Applicant: IMMERSION CORPORATION, San Jose, CA (US)

(72) Inventor: Hugues-Antoine Oliver, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/618,372

(22) Filed: Jun. 9, 2017

(65) Prior Publication Data

US 2018/0359412 A1 Dec. 13, 2018

(51) Int. Cl.
*H04N 5/225* (2006.01)
*H04N 5/232* (2006.01)

(52) U.S. Cl.
CPC ....... *H04N 5/23229* (2013.01); *H04N 5/2258* (2013.01)

(58) Field of Classification Search
CPC .......... H04N 5/23229; H04N 5/2258
See application file for complete search history.

(56) References Cited

U.S. PATENT DOCUMENTS

| | | | |
|---|---|---|---|
| 9,367,136 B2 | 6/2016 | Latta et al. | |
| 9,370,459 B2 | 6/2016 | Mahoney | |
| 9,370,704 B2 | 6/2016 | Marty | |
| 9,392,094 B2 | 7/2016 | Hunt et al. | |
| 9,462,262 B1 | 10/2016 | Worley, III et al. | |
| 9,626,805 B2 | 4/2017 | Lampotang et al. | |
| 9,645,646 B2 | 5/2017 | Cowley et al. | |
| 9,652,037 B2 | 5/2017 | Rubin et al. | |
| 9,760,166 B2 | 9/2017 | Ammi et al. | |
| 9,811,854 B2 | 11/2017 | Lucido | |
| 9,851,799 B2 | 12/2017 | Keller et al. | |
| 9,933,851 B2 | 4/2018 | Goslin et al. | |
| 9,948,885 B2 | 4/2018 | Kurzweil | |
| 2008/0018748 A1* | 1/2008 | Niemi | H04N 5/232 348/218.1 |
| 2008/0084398 A1* | 4/2008 | Ito | H04N 5/23293 345/173 |
| 2009/0201378 A1* | 8/2009 | Kondo | H04N 5/225 348/207.11 |
| 2009/0244323 A1* | 10/2009 | Carter | H04N 5/232 348/231.99 |
| 2012/0105579 A1* | 5/2012 | Jeon | H04N 5/2258 348/38 |
| 2014/0104453 A1* | 4/2014 | Fujinawa | H04N 5/23219 348/222.1 |
| 2014/0192247 A1 | 7/2014 | Cheong et al. | |

(Continued)

FOREIGN PATENT DOCUMENTS

EP 2942693 A1 11/2015

*Primary Examiner* — Jason A Flohre
(74) *Attorney, Agent, or Firm* — Miles & Stockbridge, P.C.

(57) ABSTRACT

A haptic effect enabled system that includes a first image sensor, a second image sensor, a haptic output device and a processor coupled to the image sensors and haptic output device. The first image sensor generates a first digital image and the second image sensor generates a second digital image. The processor receives notification of an image event relating to the first or second digital image. The processor determines a haptic effect corresponding to the image event and applies the haptic effect with the haptic output device.

20 Claims, 5 Drawing Sheets

(56) References Cited

U.S. PATENT DOCUMENTS

| | | |
|---|---|---|
| 2014/0333625 A1 | 11/2014 | Itkowitz et al. |
| 2014/0351698 A1 | 11/2014 | Nakagawa |
| 2015/0109528 A1 | 4/2015 | Choi et al. |
| 2015/0192997 A1 | 7/2015 | Nakagawa |
| 2015/0192998 A1 | 7/2015 | Ishimaru et al. |
| 2015/0201130 A1* | 7/2015 | Cho .................. H04N 5/23293 348/333.05 |
| 2015/0205356 A1 | 7/2015 | Mori |
| 2015/0261296 A1 | 9/2015 | Yoshikawa |
| 2015/0277564 A1 | 10/2015 | Saito |
| 2015/0304549 A1* | 10/2015 | Lee ..................... H04N 5/2258 348/211.4 |
| 2015/0334292 A1* | 11/2015 | Tartz ................. H04N 5/23222 348/222.1 |
| 2016/0065831 A1 | 3/2016 | Howard et al. |
| 2016/0070348 A1 | 3/2016 | Cowley et al. |
| 2016/0078278 A1 | 3/2016 | Moore et al. |
| 2016/0080897 A1 | 3/2016 | Moore et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0259410 A1 | 9/2016 | Moore |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0289462 A1* | 10/2017 | Eum .................... H04N 5/2258 |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

* cited by examiner

HAPTIC ENABLED DEVICE WITH MULTI-IMAGE CAPTURING ABILITIES

TECHNICAL FIELD

This patent document relates to haptic effects and, more particularly, to haptic enabled devices with multi-image capturing abilities.

BACKGROUND

Multi-image capturing devices, such as digital cameras, smart phones, smart tablets, video recorders, etc., are generally able to provide a user of the device with improved images over those that could be obtained with a single-image capturing device. In certain configurations, the multi-image capturing devices include two lenses and two corresponding image sensors wherein each of the lenses has a different focal length, e.g. a wide angle lens and a zoom lens; the images captured at the image sensors are combined to generate a single image with improved sharpness of detail. In other configurations, the multi-image capturing devices include a plurality of lenses and corresponding image sensors wherein a portion of the image sensors provide color images while the other portion of the image sensors provide black and white images; the images of the various sensors can be combined to generate a single image with improved resolution. The presence of more than one lens and one image sensor provides a user of the device with the ability to adjust various options related to each lens and/or image sensor independently or in combination. However, determining when an adjustment is occurring or has occurred is not immediately ascertainable to the user. In some instances, visual notifications of adjustments can be provided on an LCD or other type of display however checking the display requires the user to take their eye off their photographic target and possibly move or otherwise disturb the image they are attempting to acquire.

SUMMARY

This patent document relates to haptic enabled devices with multi-image capturing abilities.

In one aspect, the present patent document is directed to a haptic effect enabled system that includes a first image sensor, a second image sensor, a haptic output device and a processor coupled to the image sensors and haptic output device. The first image sensor generates a first digital image and the second image sensor generates a second digital image. The processor receives notification of an image event relating to the first or second digital image. The processor determines a haptic effect corresponding to the image event and applies the haptic effect with the haptic output device.

In another aspect, the present patent document is directed to a haptic effect enabled system that includes a first image sensor, a second image sensor, a haptic output device and a processor coupled to the image sensors and the haptic output device. The processor receives notification of a first image event relating to the first digital image and a notification of a second image event relating to the second digital image. The processor determines a first haptic effect corresponding to the first image event and a second haptic effect corresponding to the second image event. The processor applies the first haptic effect with the haptic output device, applies a completion haptic effect with the haptic output device after application of the first haptic effect, and applies the second haptic effect with the haptic output device after application of the completion haptic effect.

In still another aspect, the present patent document is directed to a method for producing a haptic effect that includes: receiving a first digital image from a first image sensor; receiving a second digital image from a second image sensor; receiving a notification of an image event relating to the first digital image or the second digital image; determining a haptic effect corresponding to the image event; and applying the haptic effect with a haptic output device.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

In general terms, this patent document relates to haptic enabled devices with multi-image capturing abilities.

Haptic enabled devices with multi-image capturing abilities of the present patent document provide haptic feedback to a user of the device to indicate when an image event related to one or more of the images captured by image sensors of the haptic enabled device has started, is ongoing, or has completed. The image event can be initiated via input sensors activated by a user of the device or via automatic image events performed by an image processor. Different types of haptic feedback, e.g. haptic effects, can be provided for the different types of image events enabling a user of the device to sense the image event without having to consult a visual display indicating the status of such events.

The image events, can include the starting, stopping or ongoing occurrence of a change in, for example: a white balance setting; an ISO setting; a shutter speed setting; a depth of field setting; an aperture size setting; a zooming operation; an anti-shake feature; a GPS tag feature; a flash; a photo size; a face detection feature; a filter; a metering feature; exposure compensation; a scene mode; image stitching; passive auto-focus; active auto-focus; hybrid auto-focus; switching from a first image to a second image; any other event related to the images capture or to be captured by the image sensors of the device. One or more of the image events can be applied simultaneously or discretely to one or more of the image capturing devices; different image events can be applied to different image capturing devices. In certain example embodiments, all pertinent image events are applied to one image capturing device before image events are applied to another image capturing device.

Figure 1:
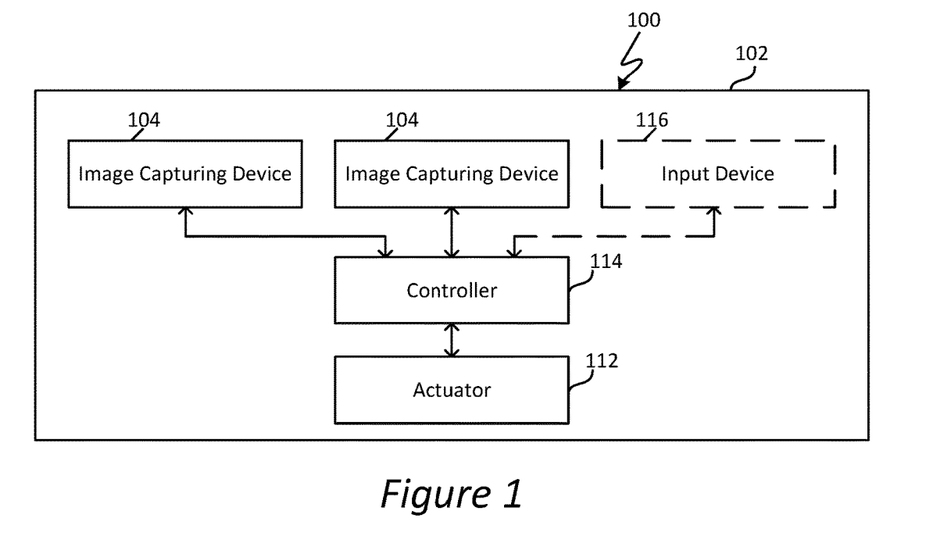
FIG. 1 is a schematic of a haptic enabled device with multi-image capturing abilities according to various embodiments disclosed herein.

Referring to FIG. 1, an example of a haptic enabled device 100 with image capturing abilities is illustrated. The device 100 includes a housing 102, at least two image capturing devices 104, an actuator 112 and a controller 114. In various embodiments, the device 100 can additionally include an input sensor 116. In general terms, the controller 114 operates to receive inputs from, or data related to, the image capturing devices 104 or the input sensor 116, and operates to generate one or more outputs based on the received inputs or data. At least one of the outputs from the controller instructs the actuator 112 to deliver a haptic effect at the housing 102. The haptic effect can be any type of tactile sensation delivered directly or indirectly to a user. The haptic effect embodies a message such as a cue, notification, or more complex information.

The haptic enabled device 100 can comprise, for example: a smart phone, tablet, laptop computer, desktop computer, gaming system, television, monitor, still picture camera, video camera, combination still and video camera, or any other device with at least two image capturing devices 104.

Figure 2:
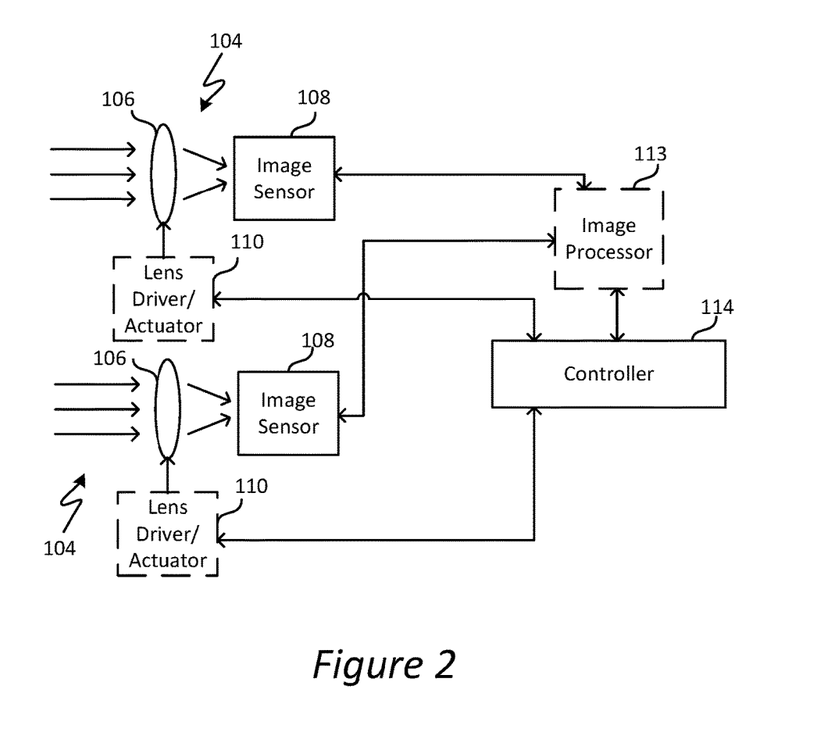
FIG. 2 is a schematic of an example embodiment of an image capturing system having two image capturing devices that can be utilized by the haptic enabled device with multi-image capturing abilities of FIG. 1.

Referring to FIG. 2, each of the at least two image capturing devices 104 includes a lens 106 and an image sensor 108, and can additionally include a lens driver/actuator 110.

Each lens 106 can comprise, for example, a lens of fixed focal length, a lens of variable focal length such as a zoom lens, a lens with a fixed aperture, a lens with an adjustable aperture, a prism, a mirror or any other type of device that is capable of focusing light onto the image sensor 108. Further, each lens 106 can comprise a single lens or a plurality of lenses, e.g. a lens assembly, to direct light to one or more image sensors 108. In various example embodiments, one of the at least two image capturing devices 104 uses a lens 106 of a first type while another of the at least two image capturing devices 104 uses a lens 106 of a different type while in other embodiments the at least two image capturing devices 104 use the same type of lens 106. Selection of the lens type can be based on the resultant image type desired, for example, a three-dimensional image, a stereoscopic image, or a two-dimensional image.

Each image sensor 108 generally comprises a light detector, for example, a charge-coupled device (CCD), complementary metal-oxide-semiconductor (CMOS) image sensor, or any other device that is capable of capturing incoming light rays and converting them into electrical signals; the light can be visible light or non-visible light, e.g. infra-red light. Each image sensor 108 can comprise a single image sensor or a plurality of image sensors that operate to detect the light from one or more lenses 106. Each image sensor 108 produces one or more outputs that are communicated to the controller 114; the outputs are used to generate the digital image captured by the image sensor 108. In various example embodiments, the outputs of the image sensors 108 are provided to an image processor 113 for generation of the image. The image processor 113 can be a physical processor separate from, but in communication with, the controller 114, a physical component incorporated into the controller 114, or a software module (see image processing module 330 of FIG. 3) of the controller 114. The image processor 113 can be configured to combine the outputs of the image sensors 108 to generate the type of resultant image desired or can maintain the outputs of each of the image sensors 108 as a separate image.

Each lens driver/actuator 110 can be any device or combination of devices that operate to control movement of the lens 106. For example, the lens/driver actuator 110 can comprise a voice coil motor (VCM), a piezoelectric motor, a stepper motor, or micro-electro-mechanical-system (MEMS) technology. Each lens driver/actuator 110 operates under direction of the controller 114.

The actuator 112 can be any controlled mechanism or other structure that initiates movement for delivery of a haptic effect. The haptic effect can be any type of tactile sensation delivered from the device 100 to the user. Examples of actuators 112 include mechanisms such as motors, linear actuators (e.g. solenoids), magnetic or electromagnetic mechanisms. Additional examples of actuators 112 include smart materials such as shape memory alloys, piezoelectric materials, electroactive polymers, and materials containing smart fluids. The actuator 112 can comprise a single actuator or a plurality of actuators provided within the device 100. In the instance of a plurality of actuators 112, the actuators can be provided in an actuator array, or individually positioned, with the actuators 112 equidistantly spaced or non-equidistantly spaced; the plurality of actuators can operate simultaneously or individually to deliver the same or different haptic effects. The haptic effect can, for example, be delivered as a vibrotactile haptic effect, an electrostatic friction (ESF) haptic effect, or a deformation haptic effect. The actuator 112 operates under direction of the controller 114.

The controller 114 is any type of circuit that controls operation of the actuator 111 based on inputs or data received at the controller 114 in relation to the images captured by the image-sensors 108. Data can be any type of parameters (e.g., conditions or events), instructions, flags, or other information that is processed by the processors, program modules and other hardware disclosed herein.

The input sensor 116 can be any instrument or other device that outputs a signal in response to receiving a stimulus; the input sensor 116 can be used to detect or sense a variety of different conditions or events. The input sensor 116 can be hardwired to the controller 114 or can be connected to the controller wirelessly. Further, the input sensor 116 can comprise a single sensor or a plurality of sensors that are included within, or external to, the device 100. In various example embodiments, the input sensor 116 can comprise a touch sensor (e.g., capacitive sensors, force-sensitive resistors, strain gauges, piezoelectric sensors, etc.) that lies behind a surface of the device 100. The surfaces of the electronic device 100 can include, for example, the surfaces of a device housing, the surfaces of a device touchscreen, the surfaces of a device display screen, or the surfaces of a device button or switch.

Various other examples of input sensors 116 include acoustical or sound sensors such as microphones; vibration sensors; electrical and magnetic sensors such as voltage detectors or hall-effect sensors; flow sensors; navigational sensors or instruments such as GPS receivers, altimeters, gyroscopes, or accelerometers; position, proximity, and movement-related sensors such as piezoelectric materials, rangefinders, odometers, speedometers, shock detectors; imaging and other optical sensors such as charge-coupled devices (CCD), CMOS sensors, infrared sensors, and photodetectors; pressure sensors such as barometers, piezometers, and tactile sensors; temperature and heat sensors such as thermometers, calorimeters, thermistors, thermocouples, and pyrometers; proximity and presence sensors such as motion detectors, triangulation sensors, radars, photo cells, sonars, and hall-effect sensors; biochips; biometric sensors such as blood pressure sensors, pulse/ox sensors, blood glucose sensors, and heart monitors. Additionally, the sensors can be formed with smart materials, such as piezoelectric polymers, which in some embodiments function as both a sensor and an actuator.

In operation of the haptic enabled device 100 with multi-image capturing abilities, an image event occurs, via input sensor 116 or image processor 113, relating to one or more of the images generated from the outputs of the image sensors 108 of the image capturing devices 104. The generated images are digital images that can exist in a visual form, e.g. presented on a display of the device 100, or in a non-visual form, e.g., represented by bits in a memory of the device 100. The image events that occur can be related to a single image that reflects the combining of images from each of the image sensors 108, to multiple images that reflect different combinations of the various images from the image sensors 108, or to individual images corresponding to each of the image sensors 108. The controller 114 responds to the image event by determining a haptic effect associated with the image event and by directing the actuator 112 to apply the associated haptic effect at the haptic enabled device 100 to notify the user of the haptic enabled device 100 that an image event is occurring or has occurred.

Figure 3:
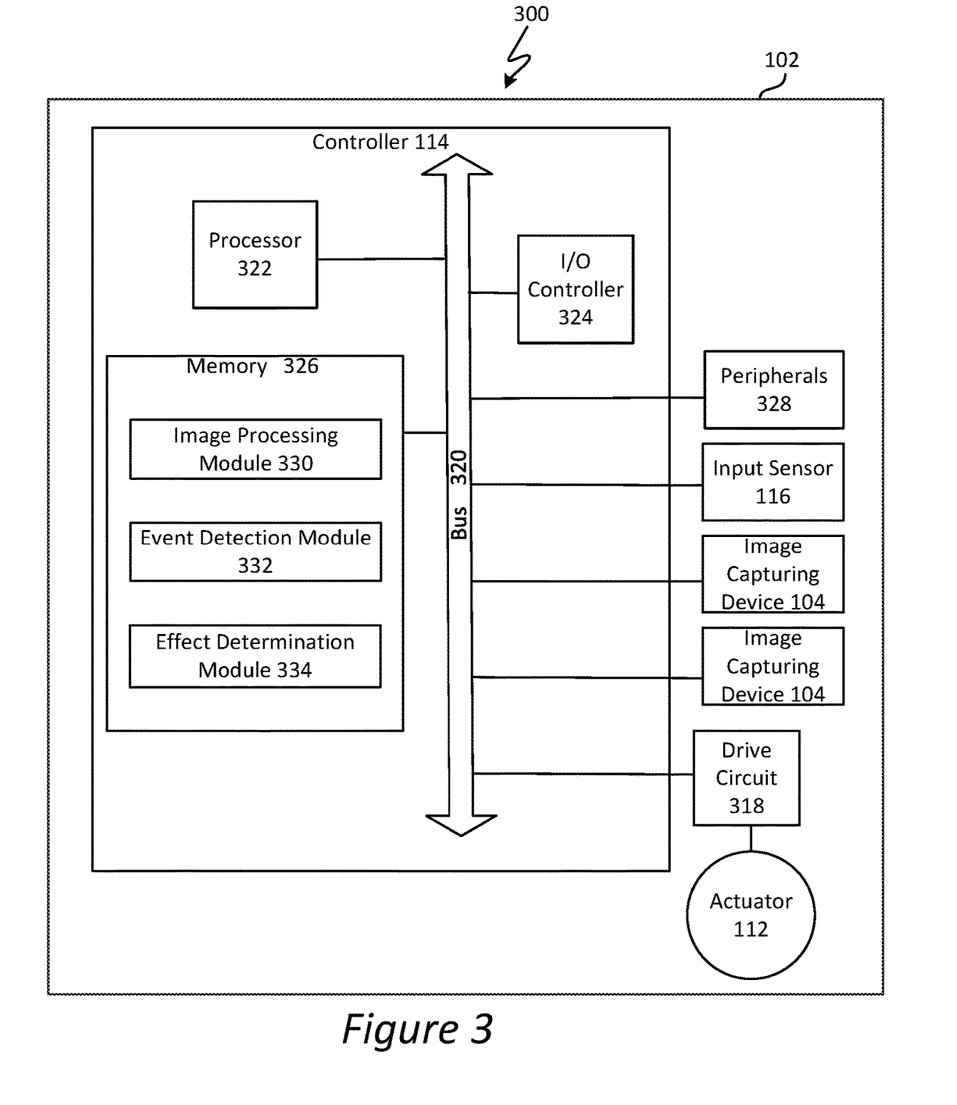
FIG. 3 is a schematic of a haptic enabled device with multi-image capturing abilities according to various embodiments disclosed herein.

FIG. 3 illustrates a more detailed schematic of an example embodiment of a haptic enabled device 300 with multi-image capturing abilities. Similar to the embodiment of FIG. 1 the device 300 includes a housing 102, at least two image capturing devices 104, an actuator 112, a controller 114 and an input sensor 116; one or more actuator drive circuits 318 are also included. The one or more actuator drive circuits 318 are circuits that receive a haptic signal from the controller 114. The haptic signal embodies haptic data, and the haptic data defines parameters that the actuator drive circuit 318 uses to generate a haptic drive signal. Examples of parameters that can be defined by the haptic data include frequency, amplitude, phase, inversion, duration, waveform, attack time, rise time, fade time, and lag or lead time relative to an event. The haptic drive signal is applied to the one or more actuators 112 causing motion within the actuators 112.

The controller 114 generally includes a bus 320, a processor 322, an input/output (I/O) controller 324 and a memory 326. The bus 320 couples the various components of the controller 114, including the I/O controller 324 and memory 326, to the processor 322. The bus 320 typically comprises a control bus, address bus, and data bus. However, the bus 320 can be any bus or combination of buses suitable to transfer data between components in the controller 114.

The processor 322 can comprise any circuit configured to process information and can include a suitable analog or digital circuit. The processor 322 can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments the processor 322 can comprise a single unit, or a combination of two or more units, with the units physically located in a single controller 114 or in separate devices.

The I/O controller 324 comprises circuitry that monitors the operation of the controller 114, and peripheral or external devices such as the image capturing devices 104, the input sensor 116 and the actuator drive circuit 318. The I/O controller 324 further manages data flow between the controller 114 and the peripheral devices, and frees the processor 322 from details associated with monitoring and controlling the peripheral devices. Examples of other peripheral or external devices 328 with which the I/O controller 324 can interface include external storage devices, monitors, input devices such as keyboards, mice or pushbuttons, external computing devices, mobile devices, and transmitters/receivers.

The memory 326 can comprise volatile memory such as random access memory (RAM), read only memory (ROM), electrically erasable programmable read only memory (EERPOM), flash memory, magnetic memory, optical memory or any other suitable memory technology. The memory 326 can also comprise a combination of volatile and nonvolatile memory.

The memory 326 stores a number of program modules for execution by the processor 322, including an image processing module 330, an event detection module 332, and an effect determination module 334. Each program module is a collection of data, routines, objects, calls and other instructions that perform one or more particular task. Although certain program modules are disclosed herein, the various instructions and tasks described for each module can, in various embodiments, be performed by a single program module, a different combination of modules, modules other than those disclosed herein, or modules executed by remote devices that are in communication with the controller 114.

The image processing module 330 is programmed to receive input data from the input sensor 116, image data from the image sensors 108, inputs from any other sources or sensors (located internally or externally to the device 300) in communication with the device 300, inputs from any of the various program modules of the device 300 or any combination thereof. The image processing module 330 generates images from the image data and executes image events related to the images (before or after the image is generated) based on the input data from the input sensors 116, input from the other sources or sensors, or inputs from the various program modules (e.g. programmed automatic operations). The image events can be executed prior to an image store-to-memory operation of the device 300 or after an image store-to-memory operation of the device 300.

The image events, can include the starting, stopping or ongoing occurrence of a change in:

(a) a white balance setting (e.g. a color balance to make an image warmer or cooler) of the device 100, 300;

(b) an ISO setting (e.g. sensitivity of the sensors 108 to light) of the device 100, 300;

(c) a shutter speed setting (e.g., the time for which a shutter is open) of the device 100, 300;

(d) a depth of field setting (e.g. the distance between the closest and furthest point in an image that are in acceptable focus; shorter depth of field—small amount of image in focus; larger depth of field—larger amount of image in focus) of the device 100, 300;

(e) an aperture size setting (e.g. f-stop setting);

(f) a zooming operation (e.g., zooming-in a lens reduces the quality of the image due to the reduction in the number of pixels utilized by the image sensor 108 from which the image will be generated; zooming-out of the lens increases quality of the image due to additional pixels being used by the image sensor 108.) of the device 100, 300;

(g) an anti-shake feature of the device 100, 300, (h) a GPS tag feature of the device 100, 300;

(i) a flash of the device 100, 300;

(j) a photo size generated by the device 100, 300;

(k) a face detection feature of the device 100, 300;

(l) a filter of the device 100, 300;

(m) a metering feature (e.g. measuring the brightness of the subject of the image) of the device 100, 300;

(n) exposure compensation (e.g., making the image brighter or darker) of the device 100, 300;

(o) a scene or scene mode (e.g. pre-set exposure mode) of the device 100, 300;

(p) applying a template to an image captured by the device 100, 300;

(q) a timer of the device 100, 300;

(r) image stitching/photo stitching of overlapping images to create a panoramic image with the device 100, 300;

(s) performance of passive auto-focus using phase detection (PD) or performance of passive auto-focusing using contrast detection by the device 100, 300;

(t) performance of active auto-focus by the device 100, 300;

(u) performance of hybrid (e.g. combination of passive and active) auto-focus by the by the device 100, 300;

(v) switching from performing image events related to a first image captured by one by the image sensors 108 to performing image events related to a second image captured by another of the image sensors 108; or (w) any other event related to the images captured or to be captured by the image sensors 108 of the device 100, 300.

In certain examples, the image events can include the approaching, meeting, or receding from a threshold value or measurement by the device 100, 300. For example, in the instance of a device 100, 300 with an auto-focus feature some type of radiation (e.g. sonar, laser, structured light) is sent towards a scene. The reflection from the objects in the scene is captured by one or more of the image sensors 108 and analyzed by the image processing module 330 using triangulation to determine to determine the objects' distance from the camera; the determination of the distance is used to trigger a haptic effect. In the instance of a device 100, 300 with a passive auto-focus feature, one or more image sensors 108 detects a scene under its own ambient light illumination while phase detection or contrast detection schemes are used to determine an objects distance within the scene; the determination of the distance is used to trigger a haptic effect. The image processing module 330 can include processing algorithms to identify a spot on the image sensor(s) 108 corresponding to particular targets within an image to focus or blur (e.g. identifying a face and focusing the pixels corresponding to the face). When a level or threshold of focusing or blurring is achieved a haptic effect is triggered.

Figure 4:
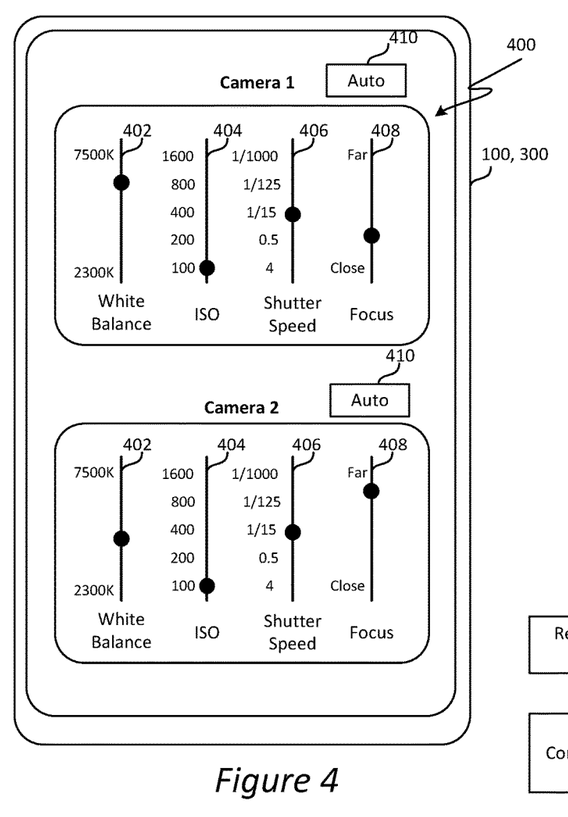
FIG. 4 is an example of a user interface that can be used to input image related events to the haptic enabled device with multi-image capturing abilities.

FIG. 4, provides an example of a user interface 400 usable with device 100 or 300 comprising a touch screen with underlying touch sensors comprising the input sensor(s) 116 (see FIGS. 1 and 3). A user of the device 100 or 300 can enter via the user interface 400 image events for each of the at least two image-capturing devices 104, which in this example, are identified as "Camera 1" and "Camera 2." The user interface 400 provides each of "Camera 1" and "Camera 2" with a slidable scale 402 adjustment for white balance, a slidable scale 404 adjustment for ISO setting (e.g., an adjustment of the light sensitivity of the image sensor 108), a slidable scale 406 adjustment for shutter speed, and a slidable scale 408 adjustment for focus, or focal length. Alternatively, the user may select the "AUTO" icon 410 enabling the device 300 to automatically set each of the noted adjustments and/or other image events affecting an image.

While the example of FIG. 4 illustrates slidable scales as the interface for user input, other user interfaces such as a keyboard for data entry, push buttons, selectors, or any other type of interface enabling user input to the device 100 or 300 can be used. The user interface and user inputs can be configured within the user interface 400 to additionally or alternatively include options for the various other image events noted herein.

Referring once again to FIG. 3, the inputs for the image events are received at the controller 114. The controller 114 responds by directing the lens drivers 110, the image sensors 108 and/or any other component/module having the ability to apply the image events, to perform their designated function. The start, ongoing occurrence, or completion of each image event, based on user input or automatic operation of the device 300 can be deemed a haptic event for which haptic event data can be generated by the image processing module 330.

The event detection module 332 is programmed to receive image event data from the image processing module 330 and evaluate the received image event data to determine if the image event data is associated with a haptic effect. Upon the event detection module 332 determining that the image event data is associated with a haptic effect, the effect determination module 334 selects a haptic effect to deliver through the actuator 112. An example technique that the effect determination module 334 can use to select a haptic effect includes rules programmed to make decisions on the selection of a haptic effect. Another example technique that can be used by the effect determination module 334 to select a haptic effect includes lookup tables or databases that relate the haptic effect to the event data.

Upon selection of the haptic effect, the controller 114 generates a haptic instruction signal to the actuator drive circuit 318 to direct activation of the one or more actuators 112 to deliver the haptic effect at the device 300, 100. The actuator drive circuit 318 generates a corresponding actuator drive signal that is delivered to the actuator 112 causing actuator operation.

As noted herein, the haptic instruction signal embodies haptic data, and the haptic data defines parameters that the actuator drive circuit 318 uses to generate a haptic drive signal. Examples of parameters that can be defined by the haptic data include frequency, amplitude, phase, inversion, duration, waveform, attack time, rise time, fade time, and lag or lead time relative to an event. The haptic drive signal is applied to the one or more actuators 112 causing motion within the actuators 112 thereby delivering to the user of the device a haptic effect. The delivery of the haptic effect can be configured to be delivered simultaneously to, prior to, or after the image adjustment made by the device 300 to represent, for example, an ongoing image adjustment, a start of an image adjustment or the completion of an image adjustment; different haptic effects can be used to indicate different adjustments.

Figure 5:
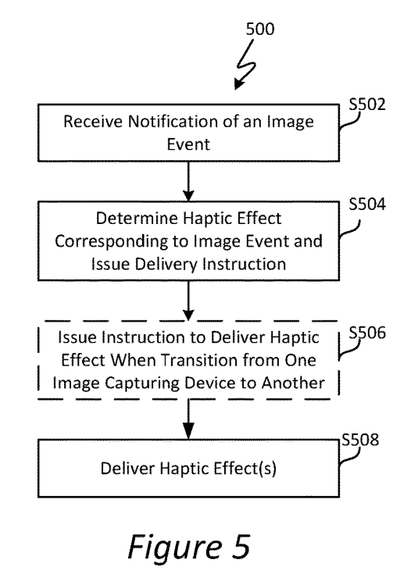
FIG. 5 is a flowchart illustrating a method for delivering haptic effects in a device with multi-image capturing abilities.

FIG. 5 provides a flowchart illustrating a simplified method 500 of operation for a haptic enabled device with multi-image capturing abilities. The method 500 can be utilized with any of the various embodiments or combination of embodiments described herein. The method 500 includes: receiving notification of an image event related to any one or more of the images captured by the at least two image capturing device, S502; determining the haptic effect stored in memory that corresponds to the image event and issuing an instruction to deliver the haptic effect, S504; optionally, issuing an instruction to deliver a haptic effect when the device transitions from applying image events related to one of the at least two image capturing devices to applying image events to another of the at least two image capturing devices, S506; and delivering the haptic effect(s) at the housing of the device, S508.

Figure 6:
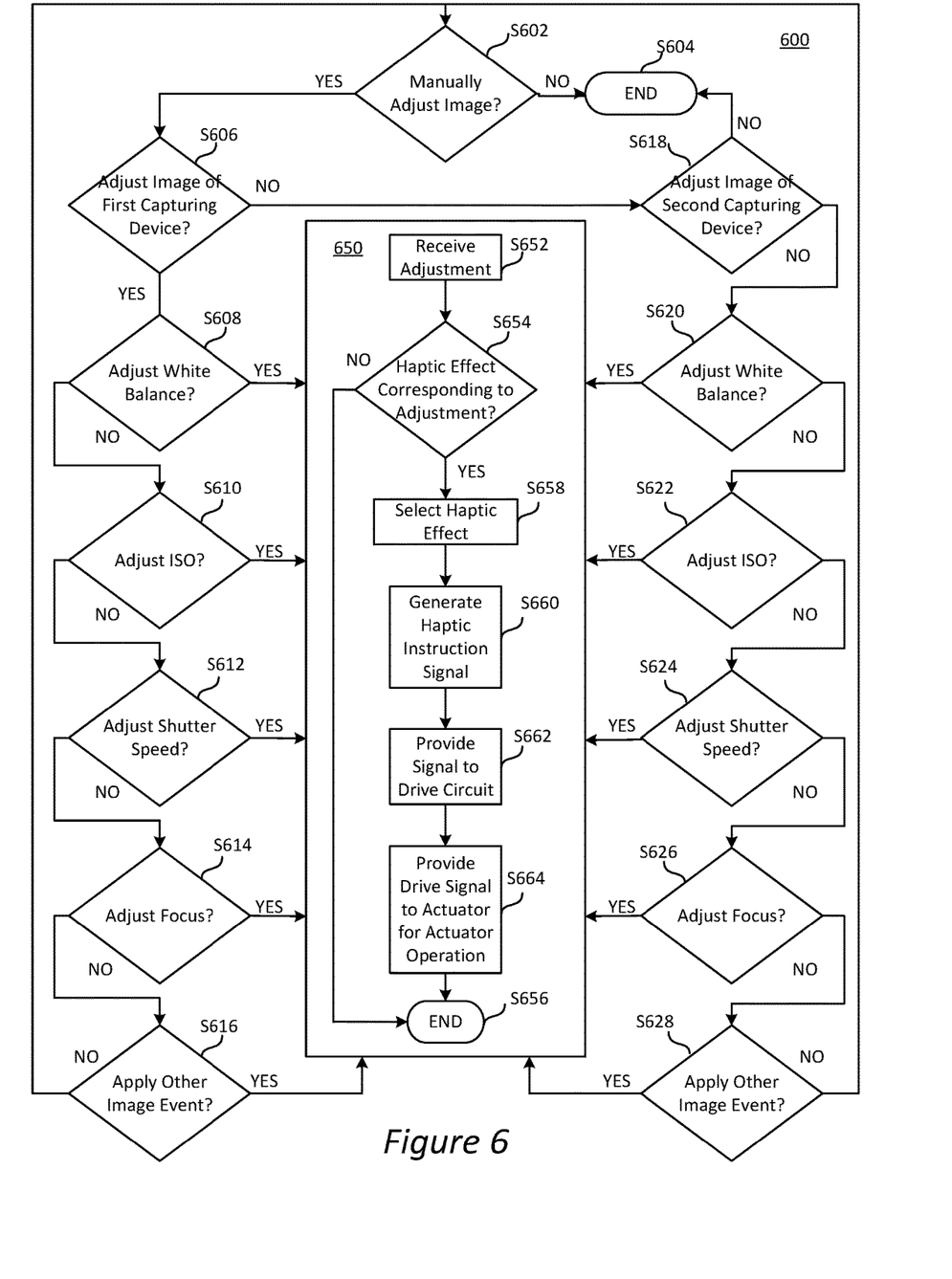
FIG. 6 is a flowchart illustrating a method for delivering haptic effects in a device with multi-image capturing abilities.

FIG. 6 provides a more detailed flowchart illustrating an example method 600 of operation for a haptic enabled device with multi-image capturing abilities. The method 600 can be utilized with any of the various embodiments or combination of embodiments described herein. The method 600 is described with reference to a haptic enabled device that includes two image capturing devices but can be expanded to include a further number of image capturing devices. The method 600 begins with determining whether user wishes to manually adjust the one or more images they have obtained with the multi-image capturing device; each manual adjustment is an image event. If the user does not wish to adjust the one or more images (S602: NO), the method 600 ends, S604. However, if the user does wish to adjust the one or more images obtained with the multi-image capturing device (S602: YES), the user is provided with the option to make image adjustments affecting the image captured or to be captured by the first image capturing device, S606.

If the user chooses to make image adjustments affecting the image captured by the first image capturing device (S606: YES), the user may then choose to adjust the white balance of the image by entering a desired adjustment through an input sensor of the device (S608: YES) or choose not to enter a white balance adjustment (S608: NO). The user can further choose to adjust the ISO setting of the image by entering a desired adjustment through an input sensor of the device (S610: YES) or choose not enter an ISO setting adjustment (S610: NO). The user can also choose to adjust the shutter speed in relation to the image by entering a shutter speed adjustment through an input sensor (S612: YES) or choose not to adjust the shutter speed (S612: NO). The user can choose to adjust the focus of the image by entering a focus adjustment through an input sensor (S614: YES) or choose not to adjust the focus (S614: NO). The user can opt to apply any other an image event that affects the image by entering a desired adjustment, parameter, setting, etc. (S616: YES) or choose not to apply any other image event (S616: NO). If any image event(s) are desired by the user, the image events are provided to the haptic effect sub-method 650, described further below. If no image events are desired, the method returns to choosing whether to manually adjust the image, S602.

If the user chooses not to apply image events to the image captured by the first image capturing device (S606: NO), the user may choose to apply image adjustments/events to the image captured by the second image capturing device, S618. If the user chooses not to apply image adjustments/events (S618: NO), the method 600 ends. If the user does choose to make manual image adjustments to the image captured by the second image capturing device (S618: YES), the user may then choose to adjust the white balance of the image by entering a desired adjustment through an input sensor of the device (S620: YES) or choose not to enter a white balance adjustment (S620: NO). The user can further choose to adjust the ISO setting of the image by entering a desired adjustment through an input sensor of the device (S622: YES) or choose not enter an ISO setting adjustment (S622: NO). The user can also choose to adjust the shutter speed in relation to the image by entering a shutter speed adjustment through an input sensor (S624: YES) or choose not to adjust the shutter speed (S624: NO). The user can choose to adjust the focus of the image by entering a focus adjustment through an input sensor (S626: YES) or choose not to adjust the focus (S626: NO). The user can opt to apply any other image event that affects the image by entering a desired adjustment, parameter, setting, etc. through an input sensor (S628: YES) or choose not to apply an image event (S628: NO). If any image events are desired by the user, the image events are provided to the haptic effect sub-method 650, described further below. If no image events are applied, the method returns to choosing whether to manually adjust the image, S602.

The haptic effect sub-method 650 operates to receive, S652, each of the image events and determines whether there is a haptic effect stored in memory corresponding to the received image event, S654. If there is no corresponding haptic effect (S654: NO), the haptic effect sub-method ends, S656. If there is a haptic effect stored in memory that corresponds to the image event (S654: YES), the corresponding haptic effect is selected, S658, and a haptic instruction signal for the selected haptic effect is generated, S660. The haptic instruction signal is then provided to a drive circuit, S662, to produce a drive signal to drive operation of an actuator to deliver the selected haptic effect, S664. Operation of the haptic effect sub-method 650 ends (S656) upon delivery of the haptic effect.

The steps of the method 600 can be performed in any appropriate order to achieve the final result of the delivery of the appropriate haptic effect. The differing haptic effects for the various image adjustments can be delivered through the same or different actuators, and can further be delivered in a simultaneous delivery manner, an overlapping delivery manner, or a distinct (e.g. one haptic effect at a time), delivery manner. The above example illustrates user inputs as the impetus for the haptic effects, however, it should be noted that automatic operation of the multi-image capturing device can also result in the delivery of haptic effects based on each image adjustment that is automatically made, for example, by an image processor.

Consider an example of a haptic enabled device with multi-image capturing abilities, wherein the device comprises a mobile smart device, e.g. tablet or phone, which incorporates a two camera system (e.g., two image capturing devices 104). The two camera system includes a wide-angle first lens with an associated image sensor, and an optical zoom second lens with an associated image sensor. The software of the mobile smart device provides a user interface whereby a user can adjust the zoom of the second lens. As the controller of the mobile smart device operates to zoom the second lens according to a user's input, the controller utilizes the image generated by one or both (e.g. combined images) of the image sensors to track the zoom while also generating an instruction to deliver a haptic corresponding to the zoom operation. For example, while zooming, a haptic effect pattern is played continuously. The haptic effect strength is correlated to the zoom position or to the quality of the image. Once the desired zoom of the second lens is completed, the controller instructs the delivery of another haptic effect, e.g., a snap-in effect, indicating the zoom is complete. Accordingly, instead of using superimposed user interface elements on top of the camera's captured image to provide information feedback about adjustments to the cameras and/or their images, dynamic haptic effects, e.g. haptic feedback, is provided to indicate the occurrence and/or completion of such an adjustment.

Figure 7:
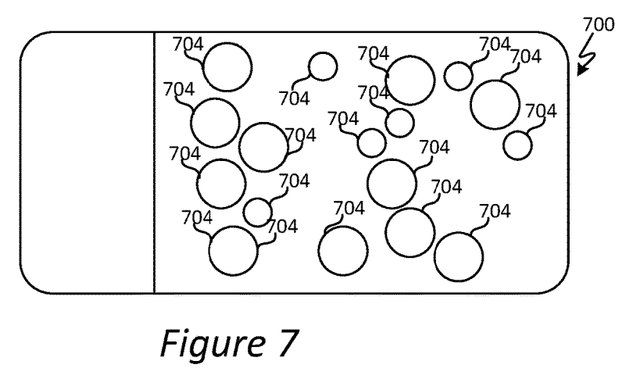
FIGS. 7-12 illustrate example embodiments of haptic enabled devices with multi-image capturing abilities.

FIGS. 7-12 illustrate additional examples of multi-image capturing devices with haptic effects in accordance with the present patent document. FIG. 7 illustrates an example of a haptic enabled device 700 in the form of a mobile phone that incorporates seventeen image capturing devices 704; the images from the image capturing devices can be combined to form a single image from which to base image adjustments/events and corresponding haptic effects, or can be combined to produce a plurality of combined images from the various image capturing devices 704 from which to base image adjustments/events and corresponding haptic effects, or be maintained as individual images corresponding to each of the image capturing devices 704 from which to based image adjustments/events and corresponding haptic effects.

Figure 8:
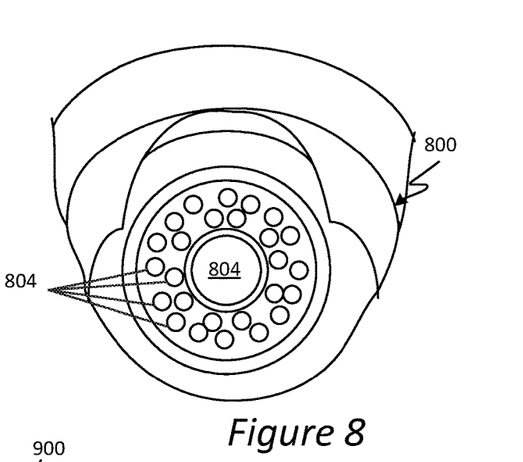
Figure 9:
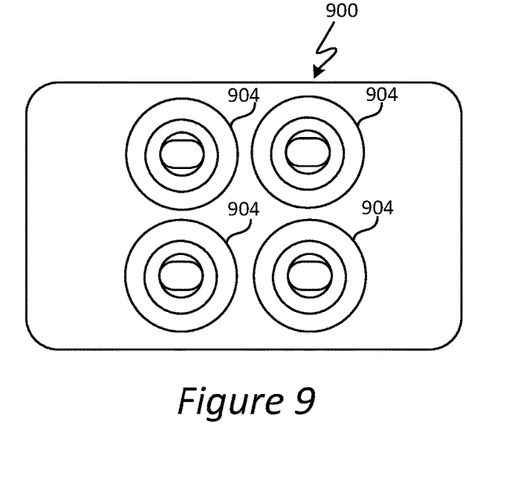
Figure 10:
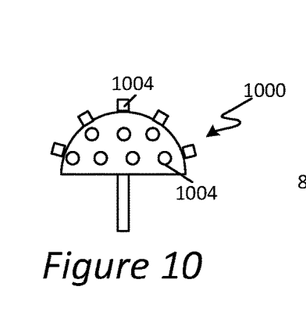
Figure 11:
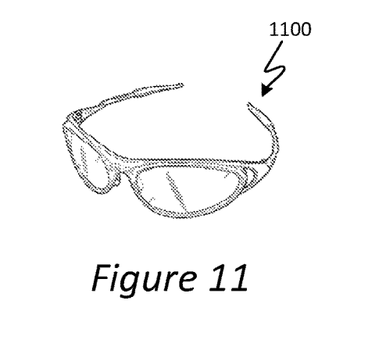
Figure 12:
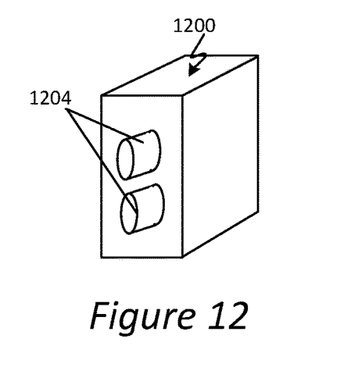

FIG. 8 illustrates an example of ceiling or wall-mounted, swiveling haptic enabled device 800 in the form of a security camera having a plurality of image capturing devices 804. FIG. 9 illustrates an example of a haptic enabled device 900 in the form of a portable camera having four image capturing device 904. FIG. 10 illustrates an example of a haptic enabled device 1000 with a plurality of image capturing device 1004 that can be used to generate, for example, a 360 degree image. FIG. 11 illustrates an example of a haptic enabled device 1100 in the form of a wearable object, e.g. glasses, equipped with at least two image capturing devices 1104. FIG. 12 illustrates an example of a haptic-enabled device 1200 in the form of a dedicated video recorder having at least two image capturing devices 1204.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims. For example, various embodiments and their operations can be applicable to haptic enabled device having only a single image capturing device.

The invention claimed is:

1. A haptic effect enabled system, comprising:
a first image sensor that generates a first digital image;
a second image sensor that generates a second digital image;
a first haptic output device;
a second haptic output device; and
a processor coupled to the first and second image sensors and to the first and second haptic output devices, wherein the processor:
receives notification of a first image event relating to the first digital image;
receives notification of a second image event relating to the second digital image;
determines a first haptic effect corresponding to the first image event;
determines a second haptic effect corresponding to the second image event;
applies the first haptic effect with the first haptic output device; and
applies the second haptic effect with the second haptic output device, at least a portion of the second haptic effect being applied at the same time as the first haptic effect.

2. The system of claim 1, wherein the first image sensor is associated with a first image capturing device having a first lens and wherein the second image sensor is associated with a second image capturing device having a second lens.

3. The system of claim 2, wherein a lens type of the first lens and a lens type of the second lens comprise a wide angle lens or a zoom lens.

4. The system of claim 2, wherein a lens type of the first lens comprises a wide angle lens and wherein a lens type of the second lens comprises a zoom lens.

5. The system of claim 1, wherein the processor receives notification of at least one of a plurality of first image events relating to the first digital image or a plurality of second image events relating to the second digital image.

6. The system of claim 1, wherein the first and second haptic effects are applied at the same time.

7. The system of claim 1, wherein the first image event or the second image event comprises a change in white balance, a change in an ISO (International Standards Organization) setting, a change in a shutter speed setting, or a change in a depth of field setting.

8. The system of claim 1, wherein the first image event or the second image event comprises: an aperture size adjustment; a zooming operation; an anti-shake operation; a GPS tag operation; a flash operation; a photo size adjustment; a face detection operation; a filter operation; a metering operation; an exposure compensation operation; a scene mode operation; an image stitching operation; a passive auto-focus operation; an active auto-focus operation; or a hybrid auto-focus operation.

9. A haptic effect enabled system, comprising:
a first image sensor that generates a first digital image;
a second image sensor that generates a second digital image;
a first haptic output device;
a second haptic output device; and
a processor coupled to the first and second image sensors and to the first and second haptic output devices, wherein the processor:
receives notification of a first image event relating to the first digital image;
receives notification of a second image event relating to the second digital image;
determines a first haptic effect corresponding to the first image event;
determine a second haptic effect corresponding to the second image event;
applies the first haptic effect with the first haptic output device;
applies a completion haptic effect with the first haptic output device after application of the first haptic effect; and
applies the second haptic effect with the second haptic output device, at least a portion of the second haptic effect being applied at the same time as the application of the first haptic effect or the completion haptic effect.

10. The system of claim 9, wherein the first image event comprises a plurality of first image events relating to the first digital image and wherein all haptic effects determined to correspond to the plurality of first image events are applied with the first haptic output device prior to applying the completion haptic effect with the first haptic output device.

11. The system of claim 9, wherein the first image sensor is associated with a first image capturing device having a first lens and wherein the second image sensor is associated with a second image capturing device having a second lens.

12. The system of claim 11, wherein a lens type of the first lens comprises a wide angle lens and wherein a lens type of the second lens comprise a zoom lens.

13. The system of claim 9, wherein the first image event or the second image event comprises a change in white balance, a change in an ISO (International Standards Organization) setting, a change in a shutter speed setting, or a change in a depth of field setting.

14. The system of claim 9, wherein the first image event or the second image event comprises: an aperture size adjustment; a zooming operation; an anti-shake operation; a GPS tag operation; a flash operation; a photo size adjustment; a face detection operation; a filter operation; a metering operation; an exposure compensation operation; a scene mode operation; an image stitching operation; a passive auto-focus operation; an active auto-focus operation; or a hybrid auto-focus operation.

15. A method of producing a haptic effect comprising:
receiving a notification of a first image event relating to a first digital image associated with a first image sensor;
receiving a notification of a second image event relating to a second digital image associated with a second image sensor;
determining a first haptic effect corresponding to the first image event;
determining a second haptic effect corresponding to the second image event;
applying the first haptic effect with a first haptic output device; and
applying the second haptic effect with a second haptic output device, at least a portion of the second haptic effect being applied at the same time as the first haptic effect.

16. The method of claim 15, wherein the first image sensor is associated with a first image capturing device having a first lens and wherein the second image sensor is associated with a second image capturing device having a second lens.

17. The method of claim 16, wherein the first lens comprises a wide-angle lens and the second lens comprises a zoom lens.

18. The method of claim 16, wherein the first image event or the second image event comprises: a change in white balance, a change in an ISO (International Standards Organization) setting, a change in a shutter speed setting, or a change in a depth of field setting.

19. The method of claim 16, wherein the first image event or the second image event comprises: an aperture size adjustment; a zooming operation; an anti-shake operation; a GPS tag operation; a flash operation; a photo size adjustment; a face detection operation; a filter operation; a metering operation; an exposure compensation operation; a scene mode operation; an image stitching operation; a passive auto-focus operation; an active auto-focus operation; or a hybrid auto-focus operation.

20. The method of claim 16, further comprising applying a completion haptic effect with the first haptic output device after applying the first haptic effect.

* * * * *